Feb. 23, 1937. J. S. FISHER 2,072,070
FRICTION ARTICLE AND METHOD OF PRODUCING SAME
Filed July 24, 1933 3 Sheets-Sheet 1

Inventor
JOHN S. FISHER
By Richey & Watts
Attorneys

Feb. 23, 1937.  J. S. FISHER  2,072,070

FRICTION ARTICLE AND METHOD OF PRODUCING SAME

Filed July 24, 1933  3 Sheets-Sheet 2

Inventor
JOHN S. FISHER
By Richey & Watts
Attorneys

Patented Feb. 23, 1937

2,072,070

UNITED STATES PATENT OFFICE 2,072,070

FRICTION ARTICLE AND METHOD OF PRODUCING SAME

John S. Fisher, Akron, Ohio, assignor to The General Metals Powder Company, Akron, Ohio, a corporation of Ohio Application July 24, 1933, Serial No. 681,861

21 Claims. (Cl. 75—22)

This invention relates to the art of friction articles and their manufacture. It relates to improved compositions of materials for use as friction generating media and to processes of making the same. More particularly, it relates to new and improved friction articles which are composite bodies and which are particularly well adapted to withstand service conditions encountered in relatively moving bodies in contact with each other, such as in brakes, clutches, and similar devices. Such uses require more or less definite but controllable coefficients of friction, long wearing life, smoothness of operation and non-abrasive characteristics, together with resistance to deteriorating action or influencing effects of oil, water or other liquids ordinarily encountered in actual use.

The present invention is a continuation, in part, of my copending application Serial No. 652,103 filed on January 16, 1933, which application was a continuation in part of my copending application No. 538,363 filed on May 18, 1931.

In the drawings accompanying and forming a part of this specification:

Figure 1:
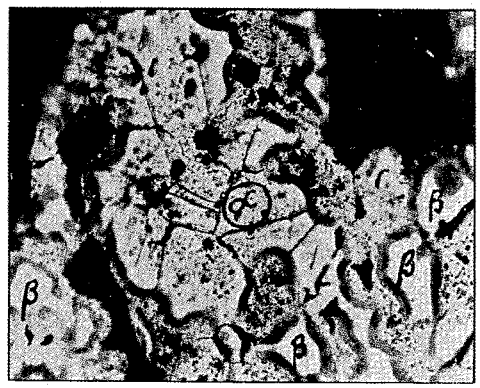
Fig. 1 is a 300 diameter micrographic enlargement of a friction article for brake uses embodying the present invention.
Figure 2:
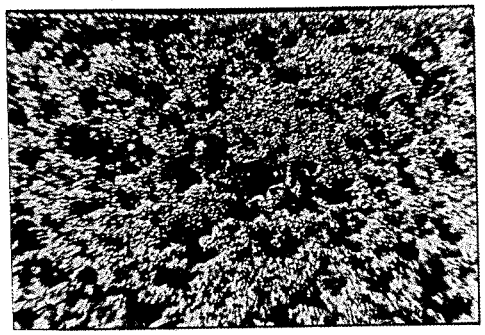
Fig. 2 is a fifteen diameter micrographic enlargement of the material of Fig. 1.

The friction articles comprehended within the present invention consist predominantly of a strong malleable, ductile, wear-resistant metallic network having a small amount of inorganic non-metallic materials dispersed therein and supported thereby. The term "network" has been selected as an expression which more or less aptly describes the structure of the metallic body of this invention. This structure may be fairly well visualized by a comparison of it with the structure of sponge rubber wherein the rubber is more or less continuous and forms a network with many open spaces. In the friction articles of this invention the metallic parts may be likened to the rubber of the sponge in continuity and in the formation of spaces. Such spaces, however, contain ingredients which were part of the starting material but which did not enter into the combination of the metals to make up the network.

This network is substantially continuous and integral and free from oxide film interruptions. It consists of the metal or alloy present in predominant amount and may include intermetallic compounds formed by the predominant metal or alloy and the metal or metals present in lesser amounts. In general, its physical and metallographic characteristics approximate those of a cold rolled and annealed article of the metal or alloy which predominates in the network. When copper is the predominant metal the resulting network may approach cold rolled and annealed alpha bronze or brass more or less closely in physical properties, such as strength, malleability, ductility, hardness and density, and in metallographic properties such as continuity, noninterruption by oxide films and the like, and grain size and shape.

When copper is used as a predominant ingredient in the network material, it may range between about 65% and about 95% by weight of the entire network material, the remaining ingredients including between about 3% and about 15% of tin and between about 5% and about 15% of lead. Under certain conditions zinc may be substituted wholly or in part for the tin. Iron, cadmium and other materials having similar hardening properties may be substituted wholly or in part for the copper. A typical composition of network forming material with which good results have been obtained is copper about 77%, tin about 8% and lead about 15%, all these percentages being by weight. For certain uses I prefer to reduce the amount of lead from about 15% to about 5% and to increase correspondingly the copper and tin contents, for, articles in which larger amounts of lead are used, possess a tendency to "fade", i. e., decrease in coefficient of friction with an increase in severity of use. I believe that the lead does not alloy totally with other ingredients in the mixture and that it cooperates with the non-metallic lubricants present to confer lubricating properties on the finished article possibly due to a smearing of the lead over other portions of the network, thereby tending to prevent seizure of the article on the friction surface in contact therewith.

The particular inorganic ingredients and the amount thereof used with the network material in articles within the present invention may vary somewhat depending upon the properties desired and the intended use of the article. These materials serve as means for controlling the coefficient of friction of the articles. These materials are dispersed more or less uniformly thruout the network and are tightly held in place by the network. They are ordinarily present in the form of flattened particles with their broad surfaces disposed parallel to the wear face of the article. These inorganic materials may have lubricant or friction qualities, and by selection of suitable materials in suitable amounts the coefficient of friction of the article may be controlled over a considerable range.

When the article is to be used for brake members, facings, or linings and similar uses, where the coefficient of friction (as defined hereinafter) should range between about .25 and about .50, between about one part and about seven and one-half parts by weight of finely divided lubricant, such as graphite or mica and between about one-half part and about ten parts by weight of finely divided friction producing ingredients as silica, emery, clay, carborundum, fused aluminum oxide, or combinations thereof, may be used. These amounts are calculated by considering the network forming material proper as constituting 100 parts by weight. Where the article is to be used for clutch members, facings or linings and for like uses, where the coefficient of friction should range between about .10 and .35, between about six parts and about fifteen parts by weight of lubricant such as graphite or mica may be used with friction producing materials as above named ranging from little or none up to about ten parts by weight.

A typical composition for a brake member, facing or lining consists of one hundred parts by weight of a metallic network material with about five parts by weight of graphite and about three parts by weight of finely divided silica. The metallic network of the composition referred to consists of about 10% tin, about 5% lead, and about 5% of zinc. A typical composition for a clutch member facing or lining article consists of about 15 parts by weight of graphite and about one hundred parts by weight of a slightly different metallic network composition which consists of about 77% copper, about 8% tin and about 15% lead.

A friction article of this invention containing about fifteen parts by weight of graphite and little or no friction producing material, will have a coefficient of friction (as defined hereafter) of about .15, while with ten parts by weight of graphite the coefficient of friction will be about .18, and with six parts of graphite the coefficient of friction will be about .20.

For this range of coefficient of friction it is necessary to use a high grade of electric furnace graphite. It is recognized that the range of coefficients of friction can be somewhat controlled by the use of less pure graphite in varying amounts; that is, graphites containing varying amounts of friction producing substances.

The friction articles of this invention possess a resistance to shear which is sufficiently high to enable the articles to withstand the repeated longitudinal stresses ordinarily encountered in use. They have resistance to compression which ranges between 10 and 65 as measured in Brinell hardness. The articles have great resistance to wear, the wear being measured in a few thousandths of an inch after many thousands of miles of operation. In certain cases automatic clutches equipped with linings constructed in accordance with this invention have operated as much as 100,000 miles without wear of the linings, which is measurable with ordinary micrometers graduated in one-thousandths of an inch. The articles have such properties of strength, density, ductility and hardness as are necessary for the severe service conditions encountered in use. Moreover, these composite articles are capable of withstanding the action of oils and other liquids with which they may come in contact.

The term "coefficient of friction", as used in this application, is defined as being that value of the friction articles of this invention which is found in the following manner: A rotatable drum of steel 14" in diameter and having a ground peripheral face 2" wide is driven at the rate of 500 R. P. M. At diametrically opposite points on the vertical center line of the drum, two disc-shaped friction articles each 1⅜" in diameter and each having a projected area of 1.5 square inches are applied to the ground surface of the drum under a given radial load. These two articles are so mounted as to transmit their combined tangential thrust to an extended lever, where such thrust may be weighed in the commonly practiced manner and calculated to the true value at the friction surface of the articles. The "coefficient of friction" is the quotient of this tangential thrust divided by the total force under which the sections are applied to the moving surface. For example, with an applied radial load of 100 pounds on these discs a tangential thrust of 15¾ pounds was developed and measured, thus indicating a "coefficient of friction" of .15.

The term "resistance to shear" as used in this application, is defined as being one-half the total load required to double-shear a 1" length of the article ⅛" thick, when placed upon two square cornered supports parallel to each other and spaced apart ½" from each other, the shearing load being applied by means of a flat square cornered member having such a width as to form a sliding fit between said two supports, and so disposed with reference to the said supports as to shear the material along two lines each 1" in length.

The term "resistance to compression" as used in this specification is defined as being the resistance of the article to permanent deformation under compression as measured in terms of Brinell hardness, using a 500 kg. load on a section of the article ⅛" thick.

Friction articles of this invention and composed of the preferred composition for brakes as above set forth, when tested for wear by being forced with a pressure of 45 pounds per square inch for a period of ten hours against a 14" brake drum revolving at a speed of 350 R. P. M., showed an average wear at the end of that time of 0.02" per hour. Practical experience with automobiles provided with brakes lined with such friction articles show long life for the articles and eminently smooth and at the same time remarkably efficient braking action.

The present method of making friction articles of this invention comprises briefly the following steps: Selecting suitable network forming and suitable inorganic materials, thoroughly mixing the several materials in the proper amounts for the intended use, suitably compressing the mixture confined in a die, suitably heat-treating the pressed article to give it the properties and structure desired and, if desired, cold working the article after heat-treatment.

The first step of selecting the ingredients has been partly outlined above. However, since the particle size of the ingredients is important, consideration should be given to this factor. In general, all the ingredients of the article should be in finely divided form. The inorganic lubricant may be used satisfactorily in sizes ranging well above and below that which will pass thru a 200 mesh screen, while the friction producing materials may exceed a size which will pass thru a 300 mesh screen. The metals present in the lesser amounts, such as tin, lead and zinc, may range in size up to particles which will not pass thru a 150 mesh screen, or larger sizes can be used, but the finer sizes are desired because they permit of a more intimate mixture with the predominant metal. The predominant metal should be quite finely divided, and, in the case of copper, the particular shape of the fine particles is important, altho not absolutely essential. I believe that the properties of the resulting article increase or are improved with decreases in the weight of definite volumes of the uncompressed particles of the predominant metal. In general, the lighter the weight of the particles of the predominant metal, the more complete will be the continuity of the network, that is the integral attachment of the particles to each other in the finished article. This continuity and the properties resulting therefrom, are, I believe, directly traceable particularly in the case of copper, to the amount of amorphous metal (that is, metal mechanically worked by distortion) which is generated during the pressing operation, for the amorphous material crystallizes during heat-treatment and integrally unites together adjacent particles of the copper to form a metallographic structure which approximates that of cold rolled annealed alpha brass or bronze, as aforesaid. I believe that the area of contact between the particles in part determines the amount of such amorphous metal formed during pressing, and, therefore, that the smaller the particles the greater will be the ratio of area of contact to surface area of the particles.

Altho the size of the particles of predominant metal has an important bearing on the physical and metallographic characteristics of the resulting article, as pointed out above, I believe that the form of the particles, particularly where copper is used, likewise has an important effect on the properties of the articles. While greatly improved results over any prior art friction articles, with which I am familiar, may be obtained by using the ordinary commercial nodular copper powder, I have found that even better results can be obtained by using the "Koehler" copper powder described and claimed in the "Koehler" Patent No. 1,777,371. The particles of this powder are flocculent or fern like and exhibit a marked tendency to intertwine and matt together with large surface contact when subjected to pressure; and, furthermore, are initially in a strained unstable condition comparable to that of worked sheet copper, due to the method of manufacture. Such powders exhibit, doubtless due to all these factors, a marked tendency to the formation of increased amounts of amorphous metal during pressing, and to crystallization of such metal with a resultant network in which substantially all of the predominant metal particles are integrally united together into a continuous network resembling that of cold rolled and annealed alpha brass or bronze.

I have found that the properties obtained from "Koehler" powder are improved more or less progressively as the weight per volume of the loose dry powder decreases. While greatly improved results, as compared with the prior art materials with which I am familiar, may be obtained with "Koehler" powder having specific gravities as high as 1.78 or even higher, better results can be obtained with finer "Koehler" powder, for example, having specific gravities of from about .75 to about .4, or even lower. This term "specific gravity", as employed thruout, is the weight in grams of one cubic centimeter of loose dry metal powder. These specific gravities may also be expressed in the form of the percentage of the weight of a similar volume of solid copper. The specific gravity of 1.78 corresponds to a weight of copper powder in loose dry form which is about 20% of the weight of a corresponding volume of solid copper, while specific gravities of .75 and .4 correspond to 12% and 4½% respectively. The weights of such powders are 29.19, 12.3, 5.56 grams per cubic inch for the 20%, 12% and 4½% copper respectively, which is still a third way of expressing the gravity of the material.

I have found, as a result of actual experiment, that such properties as the ultimate strength, elongation and hardness of pressed metal powders vary more or less inversely with the change in the specific gravity of the said metal, that is, the weights in grams per cubic inch or cubic centimeter of the powdery metal as stated above. The following table sets forth results obtained from test bars of plates ⅛" thick formed from pure "Koehler" copper powder when subjected to a manufacturing process such as to a pressure of about 12 tons per square inch and subsequently heat-treated at a temperature of about 1400 degrees F., for about fifteen minutes, after the method described herein.

| pecific gravity or wt. in grams/cc. of loose powder | Percent of sp. gr. of pure Cu | Ultimate strength of pressed bar | Elongat. in 1½" | Brinell hardness |
|---|---|---|---|---|
| .69 | 7.7 | 24900 | 11 | 57 |
| .92 | 10.3 | 12600 | 4½ | 31 |
| 1.09 | 12.2 | 11600 | 3 | 26 |
| 1.58 | 17.8 | 11930 | 4½ | 30½ |
| 2.38 | 26.7 | 12220 | 3 | 32 |

In a like manner it has been found, in making up the friction articles of the present invention, that using a feathery flocculent metal, having a low weight per volume in loose dry form, as the predominant metal in the network, results in articles possessing improved characteristics. This is believed to occur inasmuch as the predominant metal functions to bind itself, the network and the filler or base substances together in the friction articles in much the same maner as that described above for the pure metal.

The following table illustrates the improved physical properties of the friction articles of the present invention which results from using a predominant metal for the network which is fine and feathery and which has a low "specific gravity". The network was made up, in the particular samples tested, from about 70% to 80% copper of different "specific gravities", about 5% to 10% tin and from 10% to 20% lead.

As set forth above, 100 parts by weight of the network are mixed with any number of parts of filler or base lubricants or friction forming materials and in the table 6 and 15 parts of graphite are mixed with the metal network. The resulting mixtures of graphite and network material were pressed and heat-treated by a similar process, such as described heretofore, and the following results were obtained:

| Kind of copper forming part of network metal | Specific gravity or wt. in grams/cc. | Parts of graphite by weight | Parts of network metal by weight | Resistance to shear lbs. | Brinell hardness |
|---|---|---|---|---|---|
| Koehler | .49 | 6 | 100 | 1,260 | 19.3 |
| Koehler | .76 | 6 | 100 | 900 | 20.1 |
| Common commercial | 2.50 | 6 | 100 | 600 | 19.3 |
| Koehler | .49 | 15 | 100 | 495 | 13.5 |
| Koehler | .76 | 15 | 100 | 365 | 15.3 |
| Common commercial | 2.50 | 15 | 100 | 195 | Too brittle to determine |

The second step of the process, that is, mixing the several selected ingredients, may be carried out in any convenient manner as will be understood by those skilled in the art, after which the third step, namely, pressing the mixture in a die, may be accomplished. Since the materials are in finely divided dry form and it is desirable. in commercial practice, to press out articles in rapid succession, the powdered materials may be moistened slightly, for example, after being placed in the die, with some liquid which is readily volatile, such as water, naphtha or the like, which prevents the powder from being blown out of the die.

It is important that the pressure be applied at substantially right angles to the face of the resulting article which is to constitute the wear face when in use. Such an application of pressure brings about a flattening of the inorganic ingredients, so that their broad surfaces are disposed substantially parallel to the wear surfaces. In this manner lubricational and frictional effects may be obtained in the article which could only be obtained with several times the amount of inorganic material if pressed in some other manner. Since the inorganic non-metallic ingredients exert a weakening effect on the article, it is highly desirable that the amounts thereof be kept as low as possible while still attaining the desired lubricating and frictional values. This manner of pressing, therefore, enables me to obtain, for example, the same lubricating value in an article with from about one-fifth to about one-half of the graphite or mica or other similar material which might be required if the pressure was applied in some other manner.

It is also important that the articles should be sufficiently thin so that the pressure applied will compress the ingredients substantially uniformly thruout the entire thickness of the article. Such uniformity of compression tends to cause uniformity of strength and other properties thruout the article.

The amount of pressure to which the finely divided ingredients are subjected may vary over a fairly wide range, depending, among other things, upon the density and strength desired and the amount of expansion or contraction during heat treatment and subsequent aging which may be tolerated.

I have discovered that articles embodying the present invention vary in specific gravity with different pressures and that they may expand or contract in thickness and length or breadth with different pressures. This is true with varying amounts of inorganic ingredients.

Figure 7:
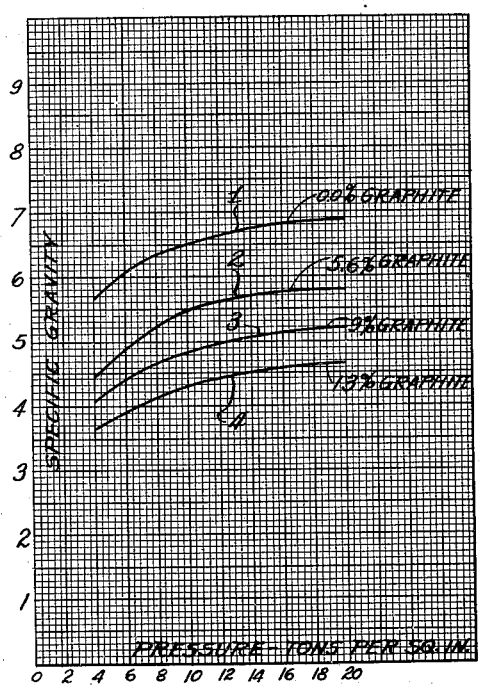
Fig. 7 shows changes in specific gravity in articles embodying the present invention when subjected to different pressures.

In Fig. 7 the effect on the specific gravity produced by different pressures is shown. Curves 1, 2, 3 and 4 show the change in specific gravities with pressures between four and twenty tons per square inch of friction articles composed of 100 parts by weight of a basic material consisting of 8.8 grams per cubic inch "Koehler" copper 77%, tin 8%, lead 15% and with zero parts, 5.6 parts, 9 parts and 13 parts by weight respectively of graphite. The calculated theoretical specific gravities which are the weight in grams per cubic inch of the compositions represented by these four curves, are 9.13, 8.75, 8.54 and 8.27 respectively.

These specific gravities are indicative of the density or solidity of the resulting articles, since the gravity materially increases with increase of applied pressure.

Figure 8:
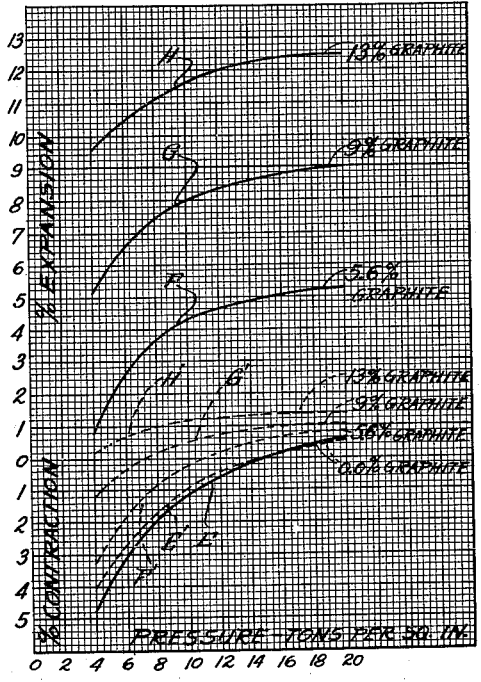
Fig. 8 shows the changes in dimensions of articles embodying the present invention during heat treatment.

Figure 8 shows the nature and extent of the changes in dimensions in the articles embodying the present invention which takes place during heat-treatment following the application of the indicated pressures. Curve E was obtained from the material from which curve 1 of Fig. 7 was obtained, and represents the change in thickness which takes place during heat-treatment after having been subjected to the pressures indicated. This curve shows that with a pressure of four tons per square inch applied to a mixture containing "Koehler" copper powder weighing 8.8 grams per cubic inch, the resulting article contracted about 4.9% in thickness during such heat treatment. At about fifteen tons pressure per square inch the resulting article of this composition did not contract or expand in thickness, while at about twenty tons pressure per square inch the article during heat treatment expanded .6%. Curve E' similarly indicates coincident changes in length or width of this same article. Curves F and F' represent the changes in thickness and length or width respectively during heat treatment after the compression at the indicated pressures of the composition from which curve 2 of Fig. 7 was composed. Similarly, curves G and G' and H and H' indicate changes in the composition from which curves 3 and 4 were obtained.

Figures 7 and 8 thus indicate pressures which may be employed and show that pressures between about ten to eighteen tons per square inch are those to be preferred, since below such range the increase in porosity is marked, while above that range the density is not greatly improved; and also show that the change in dimensions following heat treatment is more marked below this range and is not reduced above the range at a rate which makes the higher pressures essential to good commercial manufacture. I prefer so to proportion the dies that the finely divided ingredients are pressed into an article which is between about 2% and about 20% in excess of the final size desired. It should be understood, however, that the invention contemplates employing pressures below and above those stated above with the proper corrections in die size being made as taught herein to obtain the desired size in the finished article.

Following the pressing of the finely divided ingredients into the form of thin plates or bars as has just been described, the fourth step of the process, that is, the heat treatment, is carried out.

It is important that the heat treatment of articles embodying the present invention should be so practiced that various desired properties, including resistance to shear, ultimate strength, ductility, elongation, resistance to compression and metallographic structure should be attained. In general, the time and temperature of the heat treatment should be such that the lower melting point ingredients may melt and that certain of them, such as tin and zinc, may enter more or less completely into solution with the predominant metal, forming alloys and/or intermetallic compounds such as $Cu_2Sn$ and/or $Cu_2Zn_3$ more or less uniformly scattered thruout the network. These intermetallic particles are hard, brittle, beta alloy constituents and should range in amount from between about 25% to about 75% of the total volume of the metal network in the final product. The amorphous metal will be recrystallized during heat treatment to form a network which, in cases where copper is the predominant metal, correspond closely to that of rolled annealed alpha brass or bronze. Friction articles of the compositions above specified for brake members, linings or facings may be, for example, satisfactorily heat treated if heated between about 1000° F. and the melting point of the highest melting point metal present, for a period varying from about three to twenty minutes. A temperature of about 1300° F. for about twenty to thirty minutes has given satisfactory results. For clutch articles of the foregoing composition the time and temperature may extend over substantially the same ranges, but a temperature of about 1200° F. to about 1250° F. for about twenty-five minutes has given good results.

When the friction articles of this invention are heat treated as just described, the lead, zinc and tin melt, the tin and zinc combining with the copper and the metal grains growing and forming the metallic network. The molten lead has very little tendency to alloy, particularly with the copper or tin and tends to remain in situ where it solidifies during cooling of the article. Within the time and temperature ranges just specified, there is little or no tendency for molten metal to "sweat out" of the article, with resultant formation of cavities, crevices and the like, which of course are to be avoided.

It is important that the foregoing heat treatment be carried out in an atmosphere which is protective to or non-reactive with the ingredients of the article being heat treated, if formation of oxide films and the like between the particles is to be avoided. It will be understood that these films serve as interruptions to the continuity of the network and may be considered points of weakness in the article. An atmosphere suitable for articles containing copper and tin is a reducing atmosphere substantially free from oxygen such as that of an ordinary reducing flame, while for zinc, iron and other metals a more actively reducing atmosphere is desired, such as hydrogen. The protective atmosphere should surround the articles while they are being heated and until they have been cooled below an oxidizing temperature. When the articles are not allowed to cool in the furnace, but are to be removed and quenched, the protective atmosphere should surround the articles while they are being taken out of the furnace and until they have been immersed in the quenching fluid. Care should be exercised to remove oxygen-containing gases from the box, container, or furnace in which the articles are to be heat treated before the articles have been heated to an oxidizing temperature. Care should be exercised during the time the articles are at an oxidizing temperature, to exclude air from contact with the articles, because the metals mentioned, and particularly copper, have increased affinities for oxygen at elevated temperatures and when oxygen comes in contact with these metals the surface is almost instantly oxidized and thus oxide films may be formed which serve as interruptions to the continuity of the network of the resulting article.

After pressing and before heat treatment, articles made from low weight copper powder have sufficient strength to be handled. After heat treatment the articles have the strength and other properties above stated. If still further improved properties are desired, I may attain them by varying the foregoing procedure as follows: I may take the product resulting from the first pressing and heat treating operation and further reduce it in size by additional cold working, as by pressing or rolling, and again heat treating. I may again cold work the pressed and heat treated article and improve it. Such final cold working may be resorted to for bringing the heat treated article substantially to finished size.

In addition to the increase in dimensions, articles embodying the present invention, as described above and indicated in Fig. 8, I have found that a further growth or expansion takes place, in the direction in which the pressure was applied, during aging of the articles, that is, within a period of three or four days after heat treatment. For example, a friction article reduced as much as 12% in thickness by cold working after heat treatment, may, during the next three or four days, increase as much as about 5% in thickness. Due consideration for such growth, as well as for expansion during heat treatment, should be taken into consideration in designing dies to make friction articles to approximately finished dimensions,—for example, within about .001 of an inch. To that end I have devised a method by which the size of the die cavity may be accurately determined, so that the finished article will be commercially accurate. According to this procedure I first select the ingredients desired for the article and then subject separate portions thereof in a small standard die to different pressures ordinarily between about 10 and about 18 tons per square inch and heat treat each of the pressed articles under such conditions as will bring about the properties desired therein. Then I cold work these articles to give them the necessary hardness and age the articles for a period of from about three days to about a week to determine the dimensional changes due to age growth. From the changes in dimensions during heat treatment and during aging, I am able to calculate accurately the exact size of the die which should be used for that particular composition to result in an article which, after heat treatment, cold working and aging, will have the exact size required. In this manner expensive experimental die work can be avoided as well as grinding, machining, or otherwise finishing the articles to size.

Referring to the microphotographs of Figs. 1 and 2, the large dark areas represent voids in the metallic network which are normally filled wholly or in part with non-metallic lubricants such as graphite or mica. Fig. 1 clearly shows the predominance of the alpha (a) metal, and the beta (b) particles therein. It further shows the true alloy nature of the product. Microscopic examination disclosed only an occasional abrasive particle in the solid metal itself and indicated that practically all of the non-metallic lubricant and friction producing ingredients were found in the pores or voids of the metallic network. The progressive recrystallizaton of the material during heat treatment would, I believe, tend strongly to force such non-metallic particles out of the network metal and into the voids.

Friction brake articles of this invention may be produced in the form of thin discs, buttons or strips 5 (see Figs. 3 and 4) with brads or rivets 6 embedded therein. These brads or rivets may be headed or embedded in the loose material when the latter is pressed or molded into the desired form, and the finished article may be secured to a brake shoe or drum 7 as indicated.

Figure 4:
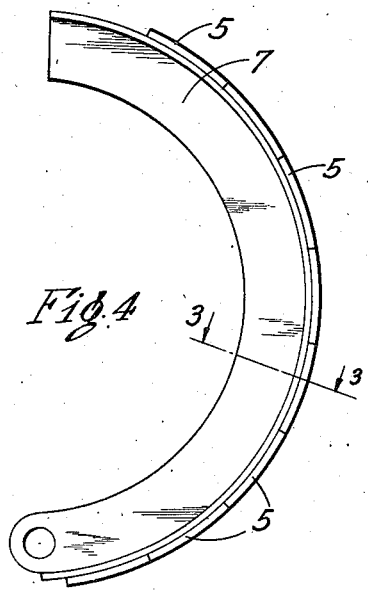
Fig. 4 is a view in side elevation of the brake shoe of Fig. 3.

Due to the high heat transfer and dissipative qualities of the article, the heat generated in the article by friction is transferred directly to the metal of the brake shoe and dissipated thru the latter. It will be understood that the showing in Figs. 3 and 4 is only illustrative and that the article may be secured to a brake shoe or other member in a continuous strip, if desired, or in any other suitable manner.

Figure 5:
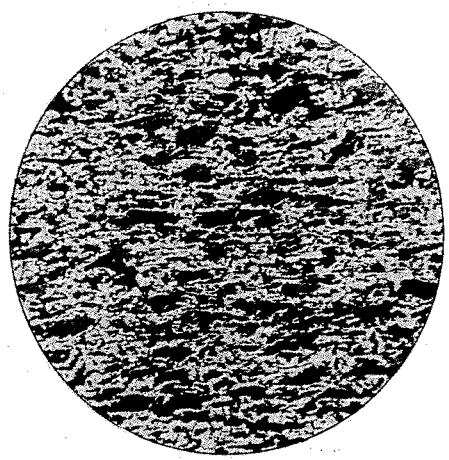
Fig. 5 is a 100 diameter micrographic enlargement of a section of a friction article for clutch uses embodying the present invention containing the above preferred composition with about 15% of graphite, showing a section at right angles to the wear surface of the article.

In Fig. 5 the dark areas are made up of lubricating and unalloyed constituents of the metallic network. The lubricants by reason of the application of compressive force at substantially right angles to the wear face (that is at right angles to the plane of this figure) result in the flat surfaces being disposed parallel to the wear face and affording from two to five times as much lubricating effect as would be the case if the article were not pressed at right angles to the wear face.

Figure 6:
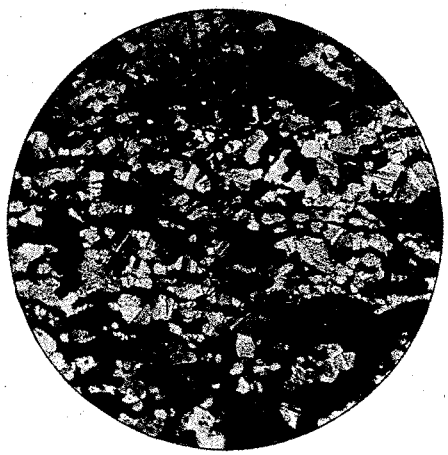
Fig. 6 is a 500 diameter micrographic enlargement of a section of the article of Fig. 5 and taken similarly to Fig. 5.

In Fig 6. the light areas represent the metallic network which, as will be noted, closely resembles the structure of rolled annealed alpha brass or bronze. The dark areas represent the position of the inorganic lubricants.

Figure 3:
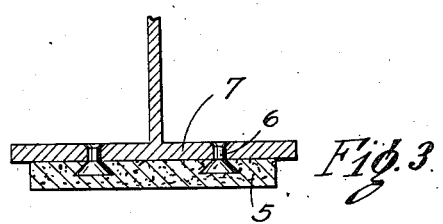
Fig. 3 is a view in cross section of a brake shoe lined with a friction article constructed in accordance with this invention.

In cases where the friction article, such as is shown at 5 in Figure 3, is not sufficiently tough and strong to retain permanently therein the means for securing the article to a brake shoe or the like, such as the rivets 6, improved properties so far as retaining the securing means may be attained by making the article 5 of different compositions. For instance, the parts in which the rivet heads are embedded may be substantially free from inorganic ingredients and thus have high strength and ductility. The wear face may be made of any composition within the foregoing ranges.

Such a composite article may be made quite readily by the foregoing process by a simple variation of the above described step of placing suitable materials in the die. For instance, the finely divided metal powders free from the non-metallic ingredients may be placed in the bottom of the die to the depth desired and then the friction composition of metals and inorganic ingredients may be placed on top of such material in the die. After pressing and heat-treating the article is composite but unitary with the bottom layer, that is, the one which is to hold the rivet heads or other securing means, being sufficiently strong and ductile to afford permanent attachment to the brake shoe or other member to which the friction article is to be attached.

The friction articles of this invention preferably possess a coefficient of friction which is low when there is slipping engagement with an opposed member, but which increases as the slippage decreases and as the engagement becomes closer or more positive and which reaches a maximum when engagement is complete, such coefficients being determined by the composition of the article as above described. For example with automobile clutch linings made from the friction materials of the present invention it is possible under usual conditions to demonstrate these characteristics. The engine of the car is started with the clutch disengaged. The car is placed in high gear and the emergency brake is set. The motor is then raced and the clutch is gradually engaged until it is completely in the engaging position with the car remaining stationary due to the set emergency brake. The clutch will of course be slipping at this time with the car engine laboring. It is a feature of the present invention that this or other slippage can be allowed to continue for long periods without overheating or excessive wear which is impossible with other friction articles.

The emergency brake is now left off and the car moves smoothly forward with an accelerating motion with the clutch slipping less and less until it completely engages. It would be logical to conclude that the clutch springs are too weak or that the coefficient of friction of the clutch facing was too low and that clutch slippage would occur on overloads. As a matter of fact this has been found not to be true under ordinary circumstances and it is quite difficult and in many instances almost impossible after it has been once engaged to slip the clutch by an overload even tho the clutch will slip as above described prior to engagement. For example after the clutch has completely engaged and the slipping stopped as above set forth the car can be speeded up to say 50 miles per hour and with the throttle left open the foot or emergency brake or both can be applied to gradually bring the car to a stop with the motor laboring but gradually dying away and stalling without breaking the clutch engagement.

It might also be mentioned that the clutch will not slip when initially engaged on heavy loads where first or second gear is employed in the car due to the mechanical advantage thus created and that accordingly the same is very satisfactory in actual service.

The foregoing test can be made under usual circumstances and demonstrates that the friction materials of the present invention can be designed to have a low coefficient of friction at high slippage with the coefficient gradually building up to a maximum when no slippage occurs. Further, the coefficient of friction, normally does not decrease even with increased engaging pressures and temperatures. Thus there is generally no tendency for a vanishing or fading coefficient of friction such as ordinarily occurs in other friction articles.

While the foregoing test indicates the advantages resulting from the use of the friction articles of the present invention as clutches it will be understood that the uses of my new friction articles are not limited thereto but that they can be employed in substantially any relation where friction articles are used such as for example for brakes. For clutches and the like the coefficient may range for example from about .15 for slipping engagement to .35 for complete non-slipping engagement for the preferred composition above set forth; while for brakes the corresponding figures may be about .20 and about .50 respectively for the preferred composition.

The term "friction article" as used herein, means and includes, and is intended to mean and include, metallic bodies which cooperate with other parts of clutches and brakes to create the friction necessary for driving or braking purposes. This term is not intended to mean or include, and does not mean or include, bearings, bushings and the like, wherein the avoidance of friction is the object desired.

Having thus described my invention so that others skilled in the art may be able to practice the same, what I desire to secure by Letters Patent is defined in what is claimed.

What is claimed is:

1. A pressed and heat-treated friction article of the character described, having a coefficient of friction between .10 and .50 and consisting of a strong metallic network substantially continuous, integral and free from interruptions, and less than about twenty parts by weight of inorganic non-metallic finely divided material dispersed in and supported by said network, said network having physical properties and metallographic structures characteristic of the predominant metal in a cold rolled and annealed condition and being strong and ductile by reason thereof.

2. A pressed and heat treated friction article of the character described, having a coefficient of friction between .10 and about .50 and consisting of a metallic network in which predominates a metal of the group consisting of copper and iron, and between about 3 and about 20 parts by weight of inorganic non-metallic finely divided material dispersed in and supported by said network, said network being substantially continuous and integral and having physical properties and metallographic structures characteristic of the predominant metal in cold rolled and annealed condition and being strong and ductile by reason thereof.

3. A pressed and heat treated friction article of the character described, having a coefficient of friction between .10 and .50, and consisting of a strong, malleable metallic network in which copper predominates and less than about 20 parts by weight of finely divided inorganic non-metallic material dispersed in and supported by the network, said network being substantially continuous, integral and free from interruptions and having physical properties and metallographic structures characteristic of cold rolled and annealed alpha bronze and being strong, malleable and ductile by reason thereof.

4. A pressed and heat-treated friction article of the character described, having a coefficient of friction between about .10 and .50, and consisting of a strong, malleable metallic network in which copper predominates, and less than about 20 parts by weight of finely divided inorganic non-metallic material dispersed in and supported by the network, said network being substantially continuous, integral and free from interruptions and having physical properties and metallographic structures characteristic of cold rolled and annealed alpha bronze and being strong, malleable and ductile by reason thereof, the inorganic material being present in the form of particles having flattened surfaces disposed substantially parallel to the wearing surface of the article.

5. A pressed and heat treated friction article of the character described, having a coefficient of friction between about .10 and .50, and consisting of a strong, malleable, metallic network in which copper predominates, and less than about 20 parts by weight of finely divided inorganic non-metallic lubricant material dispersed in and supported by the network, the lubricant material approximating between about 2% and about 20% of the network, said network being substantially continuous, integral, and free from interruptions and having physical properties and metallographic structures characteristic of cold rolled and annealed alpha bronze and being strong, malleable and ductile by reason thereof, the inorganic material being present in the form of particles having flattened surfaces disposed substantially parallel to the wearing surface of the article.

6. A strong, wear-resistant, pressed and heat treated friction article of the character described, having a coefficient of friction between about .10 and about .50 and including a metallic network and up to about twenty parts by weight of an inorganic non-metallic lubricant dispersed in and supported by said network, the said article having a resistance to transverse shear of above about 200 pounds per linear inch and a resistance to compression above a Brinell hardness of about 10.

7. A strong, wear-resistant pressed and heat treated friction article of the character described, having a coefficient of friction between about .10 and about .50 and including a metallic network, and graphite between about 2 parts and about 20 parts by weight to 100 parts by weight of the network material, the said article having a resistance to transverse shear of above about 200 pounds per linear inch and a resistance to compression above a Brinell hardness of about 10.

8. A strong, wear resistant, pressed and heat treated friction article of the character described, comprising a metallic network consisting predominantly of copper and about six parts, by weight, of an inorganic non-metallic lubricant to 100 parts, by weight, of the network material dispersed in and supported by said network, the said article having a coefficient of friction between about .10 and about .50, a resistance to transverse shear of above about 600 pounds per linear inch and a resistance to compression above a Brinell hardness of above about 19.

9. A strong, wear resistant, pressed and heat treated friction article of the character described, comprising a metallic network and up to about 15 parts, by weight, of an inorganic non-metallic lubricant, such as graphite, to 100 parts, by weight, of the network material, said lubricant being dispersed in and supported by said network, the said article having a coefficient of friction of between .10 and about .50 and having a resistance to transverse shear between about 200 and about 495 pounds per linear inch and a resistance to compression of between about 13 and about 15 in Brinell hardness.

10. A strong, wear-resistant pressed and heat treated friction article of the character described, having a coefficient of friction between about .10 and about .50 and including a metallic network in which copper predominates, and graphite between about 2 parts and about 20 parts by weight to 100 parts by weight of the network material, the said article having a resistance to transverse shear of above 200 pounds per linear inch and a resistance to compression above Brinell hardness of 10, said graphite being present in the article in the form of flattened particles having their flattened surfaces substantially parallel to the wearing surface of the article.

11. A pressed and heat-treated friction article of the character described, having a coefficient of friction between about .10 and about .50 and including a strong, integral, substantially continuous metallic network in which copper predominates, and finely divided inorganic non-metallic lubricant and friction materials up to about 20 parts by weight dispersed in and supported by said network, the network having physical properties and characteristics of cold rolled and annealed alpha bronze and being strong, malleable and ductile by reason thereof.

12. A pressed and heat treated, relatively dense, friction article suitable for lining clutches, brakes and the like, having a strong, malleable, metallic network substantially continuous, integral and free from interruptions and containing between about 65% and about 95% copper, between about 3% and about 15% of tin, and between about 5% and 15% of lead, each one hundred parts of said network carrying dispersed substantially uniformly therein between about 3 parts and about 20 parts by weight of graphite.

13. A pressed and heat-treated friction article suitable for lining clutches and the like, having a strong, malleable metallic network substantially continuous and free from interruptions and containing between about 65% and 95% of copper, between about 3% and 15% of tin, and between about 5% and about 15% of lead, each 100 parts of said network carrying dispersed substantially uniformly therein between about 3 parts and about 20 parts by weight of graphite, the graphite particles being flattened and having their broad surfaces disposed substantially parallel to the wearing surface of the article.

14. A pressed and heat-treated friction article, suitable for lining brakes and the like, having a strong, malleable metallic network substantially continuous and free from interruption and containing between about 65% and about 95% of copper, between about 3% and about 15% of tin and between about 5% and about 15% of lead, each 100 parts of said network carrying dispersed substantially uniformly therein between about 3 parts and about 15 parts by weight of graphite and up to about 10 parts by weight of an inorganic friction material, the graphite particles being flattened and having their broad surfaces disposed substantially parallel to the wearing surface of the article.

15. A pressed and heat-treated friction article of the character described, having a co-efficient of friction between about .10 and about .50 composed of between about 65% and about 95% of copper, between about 3% and about 15% tin, and about 5% and about 15% of lead, together with about three parts and about twenty parts by weight of inorganic non-metallic lubricant material, the mixture being substantially free from ingredients which may volatilize and form voids during the hereinafter described heat treatments, said article having physical properties and metallographic structure characteristic of those obtained when a mixture of substantially the same composition, within said ranges, is made from the ingredients in finely divided form with the copper weighing less than about 28 grams per cubic inch, and the mixture is subjected in a confining die to a pressure of between about 10 and about 18 tons per square inch applied to the wear face of the article and in a direction at right angles thereto, and the thus pressed article is heat treated in a protective atmosphere between about 1100° F. and below the melting point of the copper for a period ranging between about 3 and about 20 minutes.

16. A pressed and heat-treated friction article of the character described, having a coefficient of friction between about .10 and about .50 and composed of between about 65% and about 95% of copper, between about 3% and about 15% tin, and about 5% and about 15% of lead, together with about three parts and about twenty parts by weight of inorganic non-metallic lubricant material and between about one-half part and about ten parts by weight of inorganic non-metallic friction producing material, the mixture being substantially free from ingredients which may volatilize and form voids during the hereinafter described heat treatments, said article having physical properties and metallographic structure characteristic of those obtained when a mixture of substantially the same composition, within said ranges, is made from the ingredients in finely divided form with the copper weighing less than about 28 grams per cubic inch, and the mixture is subjected in a confining die to high pressures applied to the wear face of the article and in a direction at right angles thereto, and the thus pressed article is heat-treated in a protective atmosphere between about 1100° F. and below the melting point of the copper for a period ranging between about 3 and about 20 minutes.

17. A pressed and heat-treated friction article of the character described, having a coefficient of friction between about .10 and about .50 and composed of between about 65% and about 95% of copper, between about 3% and about 15% tin, and about 5% and about 15% of lead, together with about three parts and about twenty parts by weight of inorganic non-metallic lubricant material and between about one-half part and about ten parts by weight of inorganic non-metallic friction producing material, the mixture being substantially free from ingredients which may volatilize and form voids during the hereinafter described heat treatments, said article having physical properties and metallographic structure characteristic of those obtained when a mixture of substantially the same composition, within said ranges, is made from the ingredients in finely divided form with the copper weighing between about five and one-half and about 28 grams per cubic inch, and the mixture is subjected in a confining die to a pressure of between about 10 and about 18 tons per square inch applied to the wear face of the article and in a direction at right angles thereto, and the thus pressed article is heat-treated in a protective atmosphere between about 1100° F. and below the melting point of the copper for a period ranging between about 3 and about 20 minutes, and the heat-treated article is cold pressed sufficiently to reduce its size from about 2 to about 20%.

18. The method of making friction articles of the character described, which includes the steps of mixing finely divided ingredients including between about 65% and about 95% of copper, between about 35% and about 5% of other metals such as tin, lead and zinc, and between about 3% and about 20% of inorganic non-metallic lubricant material, applying high pressures to the mixture in a direction at right angles to the wear face of the resulting article to compress the mixture substantially uniformly thruout and to a desired thickness, heating the pressed article between about 1100° F. and the melting point of copper for between about 3 and about 20 minutes in a protective atmosphere while preventing the formation of interruptions in the resulting metallic network in the article and pressing the heat-treated article sufficiently to reduce its thickness between about 2% and about 20%.

19. The method of making friction articles of the character described, which includes the steps of mixing finely divided ingredients including between about 65% and about 95% of copper, between about 35% and about 5% of other metals such as tin, lead and zinc, and between about 3% and about 20% of inorganic non-metallic lubricant material and up to about 15% of inorganic non-metallic friction producing material, the mixture being substantially free from ingredients which may volatilize and form voids during the hereinafter described heat treatments, applying a pressure of between about 10 and about 18 tons per square inch to the mixture in a direction at right angles to the wear face of the resulting article to compress the mixture substantially uniformly thruout to a desired thickness, heating the pressed article between about 1100° F., and the melting point of copper for between about 3 and about 20 minutes in a protective atmosphere while preventing the formation of interruptions in the resulting metallic network in the article.

20. The method of making friction articles of the character described, which includes the steps of mixing finely divided ingredients including between about 65% and about 95% copper, between about 3% and about 15% of tin, between about 5% and about 15% of lead, and between about 3% and about 20% of inorganic non-metallic lubricant material and up to about 15% of inorganic non-metallic friction producing material, the mixture being substantially free from ingredients which may volatilize and form voids during the hereinafter described heat treatments, the copper weighting less than about 28 grams per cubic inch in loose dry form, applying a pressure between about 10 and about 18 tons per square inch to the mixture in a direction at right angles to the wear face of the resulting article to compress the mixture substantially uniformly thruout to a desired thickness, heating the pressed article between about 1100° F. and the melting point of copper for between about 3 and about 20 minutes in a protective atmosphere while preventing the formation of interruptions in the resulting metallic network in the article.

21. A pressed and heat treated friction article comprising a strong, malleable, substantially continuous and integral metallic network consisting predominantly of copper, and between about 3 and about 20 parts by weight of inorganic non-metallic lubricant material dispersed in and supported by said network, the article having a coefficient of friction between about .10 and about .50 and possessing the properties of low coefficient of friction when in slipping engagement with an opposed metal member, and a higher coefficient of friction when in non-slipping engagement with such a member, and further possessing the property of maintaining the high coefficient of friction of non-slipping engagement substantially unchanged with increase in pressures on and in temperatures of the article.

JOHN S. FISHER.